(12) United States Patent
Ismail et al.

(10) Patent No.: US 10,970,051 B2
(45) Date of Patent: *Apr. 6, 2021

(54) SYSTEMS AND METHODS FOR PROGRAMING DRONES

(71) Applicant: International Business Machines Corporation, Armonk, NY (US)

(72) Inventors: Saad Ismail, Long Island City, NY (US); Justin G. Manweiler, Somers, NY (US); Justin Weisz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,099

(22) Filed: Jan. 24, 2020

(65) Prior Publication Data
US 2020/0159503 A1   May 21, 2020

Related U.S. Application Data

(63) Continuation of application No. 15/970,456, filed on May 3, 2018, now Pat. No. 10,564,940.

(51) Int. Cl.
| | |
|---|---|
| *G06F 8/34* | (2018.01) |
| *B64C 39/02* | (2006.01) |
| *G06F 3/0482* | (2013.01) |
| *G05D 1/00* | (2006.01) |

(52) U.S. Cl.
CPC .............. *G06F 8/34* (2013.01); *B64C 39/024* (2013.01); *G05D 1/0016* (2013.01); *G06F 3/0482* (2013.01); *B64C 2201/126* (2013.01)

(58) Field of Classification Search
None
See application file for complete search history.

(56) References Cited

U.S. PATENT DOCUMENTS

| | | | |
|---|---|---|---|
| 8,260,479 B2 | 9/2012 | Christenson et al. | |
| 8,600,602 B1 | 12/2013 | McAndrew et al. | |
| 9,292,705 B2* | 3/2016 | Lemmey | G06F 21/6218 |
| 9,830,166 B2* | 11/2017 | Zhang | G06F 9/4484 |
| 9,846,521 B1* | 12/2017 | Buchheit | G06F 3/04842 |
| 9,852,642 B2* | 12/2017 | Butler | G08G 5/0082 |
| 9,892,141 B2* | 2/2018 | Darcy | A63F 13/25 |
| 9,898,932 B2* | 2/2018 | Brown | G08G 5/0086 |

(Continued)

OTHER PUBLICATIONS

Pix4D—Professional drone mapping and photogammetry software, 2018, 5 pages. Retrieved from the Internet: URL: https://pix4d.com [retrieved on May 3, 2018].

(Continued)

*Primary Examiner* — Matthew J Brophy
(74) *Attorney, Agent, or Firm* — Troutman Pepper Hamilton Sanders LLP

(57) ABSTRACT

The present application relates to systems for programming devices, such as unmanned autonomous vehicles or "drones," with a card-based format and methods for using the same. The system and methods generally comprise a programming system that receives one or more instructional cards selected by a user. The system generates an executable program based on the instructional cards received, and transmits the program to a device for execution.

20 Claims, 6 Drawing Sheets

(56) References Cited

U.S. PATENT DOCUMENTS

| | | | |
|---|---|---|---|
| 10,001,976 B2* | 6/2018 | Sarkar | G06F 8/20 |
| 10,114,618 B2* | 10/2018 | Wee | G06F 8/34 |
| 10,417,917 B2* | 9/2019 | Blomberg | G08G 5/0082 |
| 2003/0028858 A1* | 2/2003 | Hines | G06F 11/3612 717/125 |
| 2011/0173587 A1* | 7/2011 | Detwiller | G06F 8/34 717/109 |
| 2014/0316614 A1* | 10/2014 | Newman | B64C 39/024 701/3 |
| 2015/0277723 A1* | 10/2015 | Banerjee | G06F 8/36 715/763 |
| 2015/0347096 A1* | 12/2015 | Hanna | G06F 8/36 717/107 |
| 2015/0362917 A1 | 12/2015 | Wang et al. | |
| 2016/0308957 A1* | 10/2016 | Zhang | G06F 9/4484 |
| 2016/0327959 A1* | 11/2016 | Brown | G05D 1/104 |
| 2016/0357522 A1* | 12/2016 | Wee | G06F 8/34 |
| 2016/0357525 A1* | 12/2016 | Wee | G06F 9/455 |
| 2017/0131691 A1* | 5/2017 | Cheung | G06F 8/35 |
| 2017/0169065 A1* | 6/2017 | Darcy | G06F 3/0481 |
| 2017/0169248 A1* | 6/2017 | Darcy | G06Q 30/0207 |
| 2017/0263133 A1* | 9/2017 | Blomberg | G08G 5/0039 |
| 2017/0263134 A1* | 9/2017 | Blomberg | G08G 5/0082 |
| 2017/0264485 A1* | 9/2017 | Papleux | H04L 67/12 |
| 2018/0053426 A1* | 2/2018 | Butler | G08G 5/0013 |
| 2018/0173503 A1* | 6/2018 | Ghasemizadeh | G06F 3/04812 |
| 2018/0329804 A1* | 11/2018 | Conversy | G06F 11/3664 |
| 2019/0087161 A1* | 3/2019 | Sathe | G06F 9/546 |
| 2019/0138678 A1* | 5/2019 | Young | G06F 8/33 |
| 2019/0220255 A1* | 7/2019 | Taniguchi | G06F 9/44 |

OTHER PUBLICATIONS

Pierce, David, "The 3DR Solo is One Scary-Smart Drone," WIRED, Apr. 2015, 7 pages. Retrieved from the Internet: URL: https://www.wired.com/2015-04/3dr-solo-drone [retrieved on May 3, 2018].

DJI Ipad Ground Station, 2017, 3 Pages. Retrieved from the Internet: URL: http:/www.dji.com/product/Ipad-Ground-Station [retrieved on May 3, 2018].

Sanchez-Lopez, Jose Luis, et al. "Aerostack: An architecture and open-source software framework for aerial robotics." 2016 International Conference on Unmanned Aircraft Systems (ICUAS). IEEE, 2016 (Year: 2016).

Mateo, Carlos, et al. "Hammer: An Android based application for end-user industrial robot programming." 2014 I EEE/ASM E 10th International Conference on Mechatronic and Embedded Systems and Embedded Systems and Applications (MESA). IEEE, 2014. (Year: 2014).

Brunete, Alberto, et al. "User-friendly task level programming based on an online walk-through teaching approach." Industrial Robot: An International Journal 43.2 (2016): 153-163. (Year: 2016).

Wizards of the Coast LLC. Magic: The Gathering Basic Rulebook 2013. available at <https://media.wizards.com/images/magic/resources/rules/EN_MTGM 14_PrintedRulebook_LR.pdf> (Year: 2013).

Kordaki, Maria, and Anthi Gousiou. "Computer card games in computer science education: A 10-year review." Journal of Educational Technology & Society 19.4 (2016): 11-21. (Year: 2016).

Zhao, Shengdong, et al. "Magic cards: a paper tag interface for implicit robot control." Proceedings of the SIGCHI Conference on Human Factors in Computing Systems. ACM, 2009. (Year: 2009).

Slany, Wolfgang. "Catroid: a mobile visual programming system for children." Proceedings of the 11th International Conference on Interaction Design and Children. ACM, 2012 (Year: 2012).

Perry, Sean R., and James H. Taylor. "A prototype gui for unmanned air vehicle mission planning and execution." IFAC Proceedings vols. 47.3 (2014): 12214-12219. (Year: 2014).

* cited by examiner

SYSTEMS AND METHODS FOR PROGRAMING DRONES

CROSS REFERENCE TO RELATED APPLICATIONS

This application is a continuation of U.S. patent application Ser. No. 15/970,456, filed on May 3, 2018, entitled "Systems and Methods for Programming Drones," the entire contents of which are hereby incorporated by reference herein.

FIELD

The present application generally relates to systems for programming unmanned autonomous vehicles with a card-based format and methods for using the same.

BACKGROUND

Unmanned Autonomous Vehicles (UAVS) or "drones" are increasingly ready for a range of compelling services and tasks, e.g., drone package delivery, photogrammetry, and remote internet access, to name a few. However, many current limitations of drone abilities are not due to hardware capabilities, but the complexities faced by end users to create and manage autonomous workflows. Current tools for controlling drones generally allow the user to define only very specific autonomous tasks, for example, having the drone visit a series of GPS coordinate waypoints, maintaining the drone in a selected region ("bounding box"), or allow flight along a non-linear motion (e.g., a circle or a spline curve). While these tools require only limited hands-on experience, they are functionally limited and do not support new applications. On the other end of the spectrum, certain manufactures have released low-level APIs to allow end-users to directly program their drones. However, writing a sophisticated drone program to support a complex multi-step task is challenging, often requiring days-to-months of effort even for experienced software engineers. Thus, what is needed is an alternative programming methodology for helping novice drone users implement complex drone scenarios in a quick and reliable fashion.

SUMMARY

Some embodiments relate to a computer implemented method in a data processing system comprising a processor and a memory comprising instructions which are executed by the processor to cause the processor to implement a card-based programming system, the method comprising: receiving, by the programming system, one or more instructional cards selected by a user; generating, by the programming system, an executable program based on the instructional cards received by the programming system; and transmitting, by the programming system, the executable program to a device.

In some embodiments, an individual instructional card represents an action or behavior to be performed by the device, or an input to another one or more instructional cards, or a modifier to another one or more instructional cards, or a combination thereof.

In some embodiments, the programming system comprises one or more hands, wherein an individual hand comprises one or more instructional cards selected by the user that are interpreted as logical program step. In some embodiments, the programming system interprets the one or more instructional cards in a hand simultaneously with each other.

In some embodiments, the programming system further comprises one or more decks, wherein an individual deck comprises one or more hands that are interpreted as a logical program group. In some embodiments, the programming system interprets the one or more hands in a deck sequentially. In some embodiments, the programming system generates the executable program from an individual deck.

In some embodiments, the programming system comprises a graphical user interface. In some embodiments, the programming system is capable of presenting a selection of instructional cards to the user via the graphical user interface. In some embodiments, the programming system receives one or more instructional cards via the graphical user interface. In some embodiments, the programming system receives the one or more instructional cards via a digitized representation of a photograph of a card layout. In some embodiments, the graphical user interface displays the one or more instructional cards in an individual hand in a horizontal or approximately horizontal arrangement. In some embodiments, the programming system displays the one or more hands in an individual deck in a vertical arrangement.

In some embodiments, each instructional card comprises a category, a subcategory, an image, a description, and a title. In some embodiments, the category comprises one or more of: movement, input, modifier, tech, think, trigger, hand, deck, and token. In some embodiments, each instructional card further comprises one or more of an end flag, an end description, a yield, a yield description, one or more yield icons, one or more requirements, and one or more tokens.

In some embodiments, the programming system further comprises a battery meter. In some embodiments, the programming system is capable of electronic communication with the device, such that the battery meter is capable of displaying a battery level or an approximate battery level of the device via the user interface. In some embodiments, the one or more instructional cards are capable of modifying the battery meter, such that the one or more instructional cards reduce the displayed battery level based on an estimation of energy output required for the actions to be performed by the instructional cards.

In some embodiments, the device executes the executable program, and wherein the device is an unmanned autonomous vehicle.

BRIEF DESCRIPTION OF THE DRAWINGS

The foregoing and other aspects of the present disclosure are best understood from the following detailed description when read in connection with the accompanying drawings. For the purpose of illustrating the disclosure, there is shown in the drawings embodiments that are presently preferred, it being understood, however, that the disclosure is not limited to the specific embodiments disclosed.

DETAILED DESCRIPTION OF EXEMPLARY EMBODIMENTS

Figure 1:
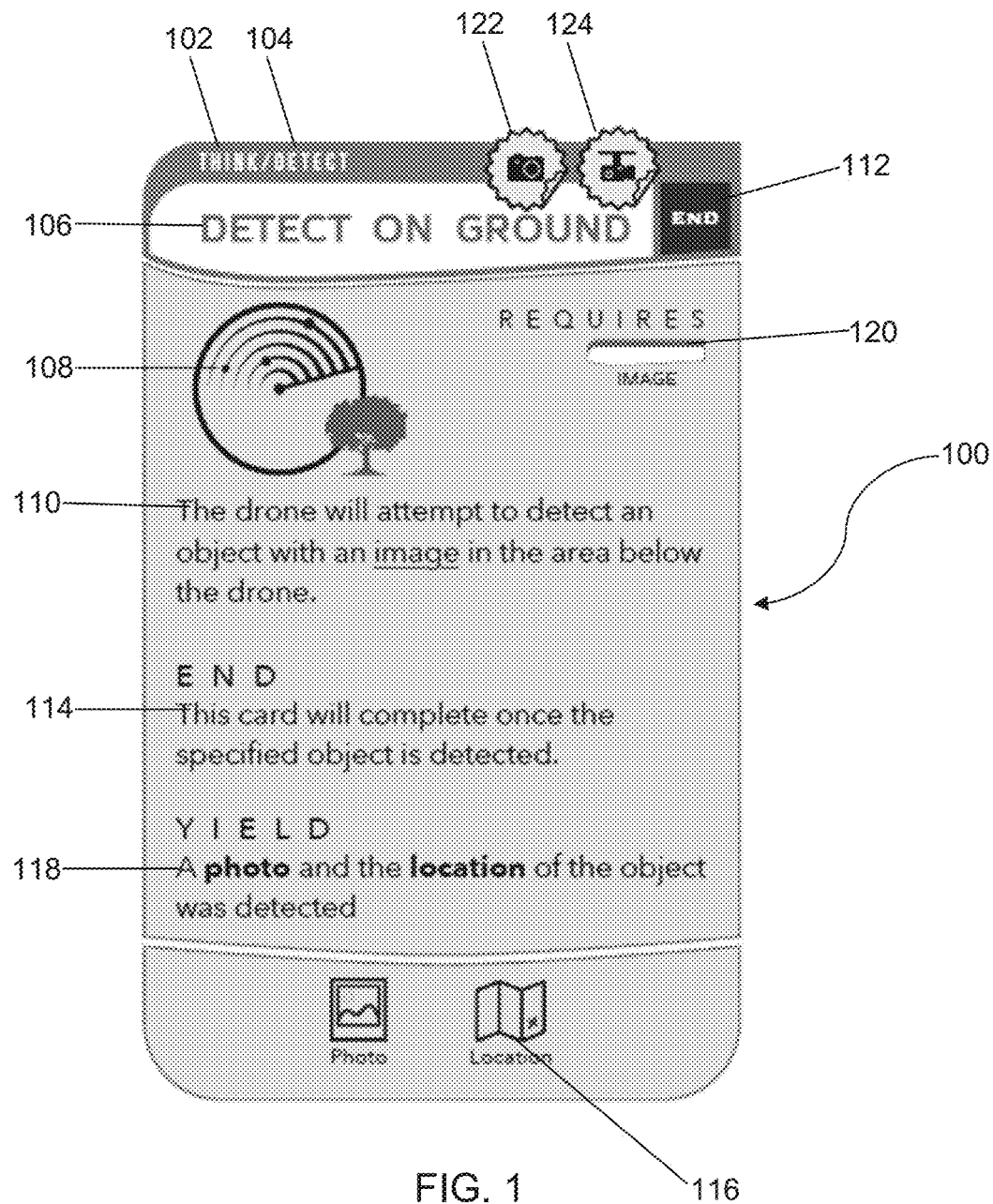
FIG. 1 depicts an example of an instructional card detailing many card symbols.
Figure 2A:
FIGS. 2A-2H depicts several examples of instructional card types.
Figure 2B:
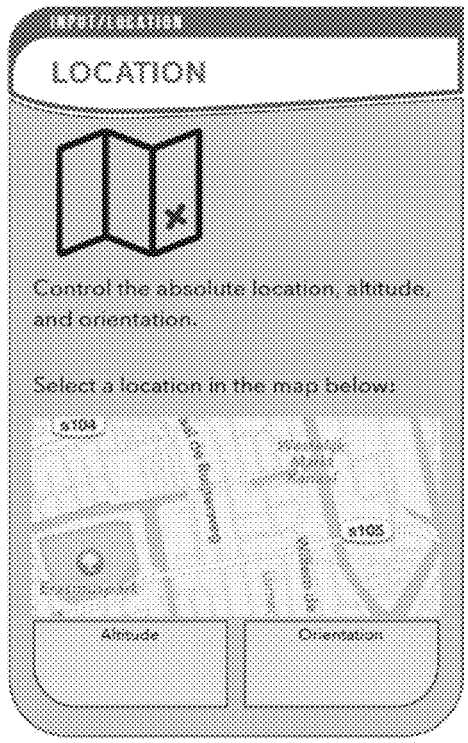
Figure 2C:
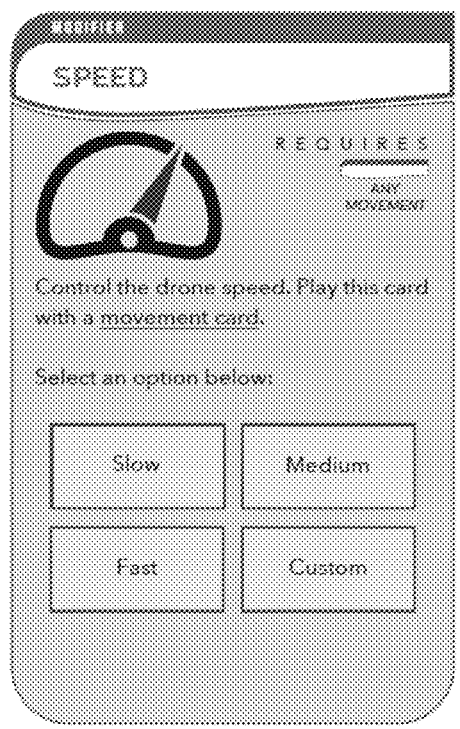
Figure 2D:
Figure 2E:
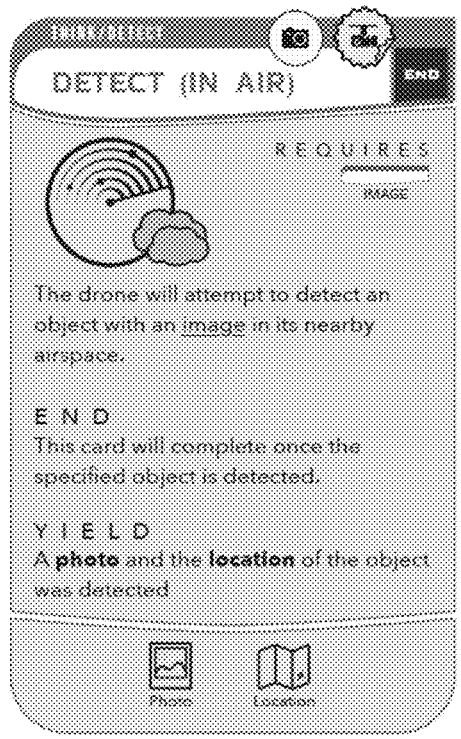
Figure 2F:
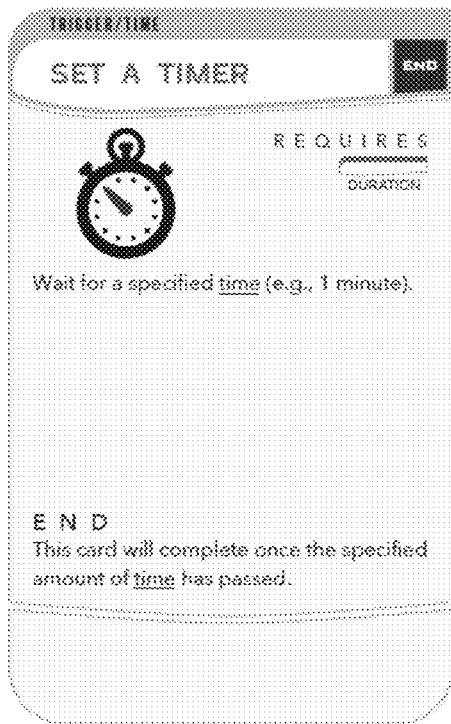
Figure 2G:
Figure 2H:
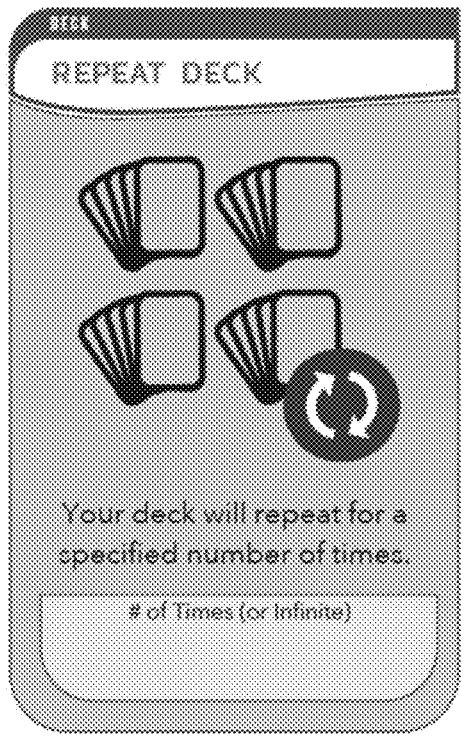

The present description and claims may make us of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-along software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situation awareness that mimic human cognition based on experiences
- Answer questions based on natural language and specific evidence Embodiments herein relate to a system and method for programming a device using a series of instructional cards. In the system, one or more instructional cards can be combined into "hands" that are interpreted as a logical programming step. If multiple hands exist, the system combines the hands into a "deck" that is interpreted as a logical programming group. The system can compile a deck into an executable program, which is then transmitted to and executed by the device.

In some embodiments, the device is an unmanned autonomous vehicle (UAV) or drone. In some embodiments, the device can fly. In some embodiments, the device is capable of receiving and executing a set of programmed instructions.

In some embodiments, an instructional card represents an action or behavior to be performed by the device, or an input to another one or more instructional cards, or a modifier to another one or more instructional cards, or a combination thereof. In some embodiments, the instructional cards are electronic images. Each instructional card comprises a title, a category, and a description. The title is the name of the card. The category defines the general purpose of the card. In some embodiments, an instructional card will have a subcategory in addition to its category. The subcategory further defines the general purpose of the card. In some embodiments, the category and subcategory allow instructional cards with similar functions to be grouped together to make it easier for a user to locate a specific card. In some embodiments, instructional cards are referred to by a naming convention of category/subcategory: title. For example, the card "Tech/Camera:TakePicture" has a category of Tech, a subcategory of Camera, and a title of Take Picture. The description describes in detail the function or functions of the card. In some embodiments, an instructional card will also have an image that is related to the function of the card.

In some embodiments, an instructional card can optionally further comprise one or more of an end flag, an end description, one or more yield icons, a yield description, one or more requirements, and one or more tokens. Instructional cards with an end flag and an end description will complete a finite amount of work prior to completion of the card, known as an end condition. An end flag is an icon that signals the user that the instructional card has an end condition, and the corresponding end description describes the end condition in detail. For example, the instructional card "Tech/Camera:TakePicture" will complete as soon as a picture is captured, and this card will not preform additional work. This card will have an end flag to signal to the user that there is an end condition, and the end description will notify the user that the card will not perform additional work once a picture is captured.

Instructional cards with one or more yield icons and a yield description will result in some form of data captured by the device. One or more yield icons signals to the user that the instructional card will result in one or more types of captured data, and the corresponding yield description describes each yield in detail. For example, the instructional card "Tech/Camera:TakePicture" will yield one picture. This card will have a yield icon to signal to the user that a yield will be captured, and the yield description will notify the user that the yield will be a picture.

Requirements are one or more inputs that an instructional card requires to function. For example, the instructional card "Movement:FlyTo" instructs the device to fly to a specified location. Thus, the requirement of the "Movement:FlyTo" card is the specified location and the required input would be a GPS location, for example. In some embodiments, an input is provided by the use of an additional card. For example, the instructional card "Input:Location" can be used to provide a GPS location for instructional card "Movement:FlyTo". In some embodiments, instructional cards that provide input for or otherwise modify another card are linked to, placed on top of, or placed next to each other. In some embodiments, an input can be a yield previously captured from another instructional card.

Tokens are icons that depict certain limitations on the types of individual instructional cards that can be placed together in a hand. While a given hand can have an unlimited number of instructional cards in it, there are physical limitations of the device that must be considered. For example, if a device is a flying drone, then only one type of flying movement per hand would be allowed, i.e., the flying drone cannot be instructed to fly to a specific location and also fly in a continuous circle at the same time. Tokens represent this limitation to a user. In some embodiments, only one copy of a specific token can be placed in one hand. For example, the instructional cards "Movement:FlyTo" and "Movement: Circle" will both display a Movement Token icon. Since a given hand may not have two copies of this token, the system will not allow both cards to be placed in the same hand. In some embodiments, the system "consumes" the first token it comes across in a hand, and will not consume a token with an identical name in that same hand. A consumed token is a one-time use item, and the instructional token cannot be used by additional cards in that hand. In some embodiments, certain tokens are not consumed. These non-consumable tokens may define a hardware aspect of the device that can be used concurrently or continuously by multiple instructional cards. For example, a humidity sensor may produce data usable by multiple processor or devices, and multiple instructional cards that have Humidity Token icon may be placed in the same hand. In some embodiments, consumed tokens and non-consumed tokens have different token icons so that a user can distinguish between the two types. In some embodiments, a consume token icon is a multi-pointed star. In some embodiments, a non-consumed token is a circle. In some embodiments, at least one instructional card of the "Token" category must be included in a hand that comprises at least one non-consumed token. For example, the instructional card "Token: HumiditySensor" is required in a hand that contains "Tech/Sensor"LogHumidity," which records the humidity level.

A representative instructional card (100) is depicted in FIG. 1 to show many of the various card features described herein. This card has a category (102) of "Think," a sub-category (104) of "Detect," and a title (106) of "Detect On Ground." In some embodiments, this card can be referred to by its title "Detect On Ground," or by its full Category/Subcategory: Title of "Think/Detect:DetectOnGround." The instructional card (100) also has a card image (108) and a description (110) that communicates the function of the card. Additional features include an end flag (112), and end description (114), yield icons (116), a yield description (118), a requirement (120), and two tokens (122 and 124).

Taken together, the information presented on instructional card (100) described the function of the card. The category (102), subcategory (104), and title (106) generally define what the instructional card (100) is going to do, in this case, detect something on the ground. This is further clarified in the description (110), which states that the drone will attempt to detect an object in the area below the drone. In order for the drone to identify which object to detect, this card (100) has a requirement (120) of an image. The drone will attempt to detect an object similar to the inputted image. If the drone can successfully detect the object, the instructional card (100) will yield a photograph of the object and locational stamp, likely in the form of a GPS coordinate, as shown by the yield icons (116) of a photo and a location, and the yield description (118). The instructional card (100) also has an end condition as shown by the end flag (112) and described in the end description (114): the card (100) will complete once the specified object has been detected. This means that once the object has been detected and the yield of a photograph and location has been captured, the instructional card (100) will perform no additional functions. For example, the card (100) will not detect a second additional object, or yield additional photographs or locations, even if additional objects were actually present in the area below the drone. Finally, the instructional card (100) has tokens (122 and 124) that indicate that a camera, either still-mounted (122) or on a gimbal (124) is required for the card (100) to function. Since the camera cannot be used for another function during this program step, the tokens (122 and 124) would be consumed during the hand. Other instructional cards that contained identical tokens could not be used in the same hand as the instructional card (100).

In some embodiments, instructional cards come in several categories. In some embodiments, the category comprises one or more of: movement, input, modifier, tech, think, trigger, hand, deck, and token. Table 1 summarizes each category with a description and a brief example. In some embodiments, instructional cards may have additional categories and subcategories beyond those listed in Table 1.

TABLE 1 instructional card categories

| Category | Description | Example |
|---|---|---|
| Movement | Directs the drone to fly | Movement: FlyTo directs device to move to a GPS coordinate specified by an Imput card. |
| Input | Numerical, categorical, or other contextual specification used by another card | Input: Location represents a GPS coordinate that can be used by a Movement card. |

TABLE 1-continued instructional card categories

| Category | Description | Example |
|---|---|---|
| Modifier | Enhances another card | Modifier: Speed can be used to slow down or speed up a Movement card. |
| Tech | Operates a hardware accessory on the device | Tech/Camera: TakePicture instructs the device equipped with a camera to take a single picture. |
| Think | Computational tasks | Think: DetectInAir applies computer vision to recognize nearly flying objects. |
| Trigger | Sets asynchronously-satisfied end condition | Trigger/Time: SetATimer sets an end condition that is satisfied after a specified amount of time has elapsed. |
| Hand | Modifies entire hand | Hand: Any requires only one end condition to be satisfied before execution continues to the next hand, instead of needing every end condition in that hand to be satisfied. |
| Deck | Modifies entire deck | Deck: Repeat will continuously repeat the entire deck, reverting to the first hand after the last hand is completed. |
| Token | Grants hardware specification tokens | Token: Movement is used by any Movement card. |

Representative instructional cards from various categories are shown in FIGS. 2A-2H. Graphic and textual elements of the instructional cards are preferably placed in the same or approximately the same location on each card. In some embodiments, instructional cards of the same category share a color scheme, or otherwise have a visual clue that will allow a user to quickly determine the category of a card. One skilled in the art will appreciate that instructional cards are not limited to the representative example cards, or category, subcategory, title, and function descriptions listed herein. Any instructional card can be contemplated as long as that card represents an action or behavior to be performed by the device, an input to another one or more instructional cards, or a modifier to another one or more instructional cards. In some embodiments, instructional cards are specific to a particular device, e.g., flying movement cards for a flying drone. Sample categories, subcategories, and titles for instructional cards are listed in Table 2.

TABLE 2 sample instructional cards

| Category | Subcategory | Title |
|---|---|---|
| Movement | Area | Cover Area |
| Movement | Area | Survey |
| Movement | Location | Circle |
| Movement | Location | Circle Repeatedly |
| Movement | Location | Fly To |
| Movement | Location | Return Home |
| Movement | Orientation | Rotate |
| Movement | Orientation | Spin Around |
| Movement | Path | Trace |
| Movement | Path | Trace Repeatedly |
| Movement | Relative | Follow |
| Movement | Simple | Fly Forward |
| Movement | Simple | Hover |
| Movement | Simple | Land |
| Movement | Sequence | Fly Path |
| Movement | Sequence | Pace |
| Input | Location | Bounding Box |
| Input | Location | Location |
| Input | Location | Path |
| Input | Direction | Cardinal Direction |
| Input | Media | Audio |
| Input | Media | Image |
| Input | Numeric | Angle |
| Input | Numeric | Distance |
| Input | Numeric | Threshold |
| Input | Relative | Relative to Location |

TABLE 2-continued sample instructional cards

| Category | Subcategory | Title |
|---|---|---|
| Input | Relative | Relative to Object |
| Input | Time | Clock Time |
| Input | Time | Duration |
| Modifier | Movement | Altitude |
| Modifier | Movement | Avoid |
| Modifier | Movement | Speed |
| Tech | Camera | Record Video |
| Tech | Camera | Take a Photo |
| Tech | Camera | Take Photos |
| Tech | Claw | Close Claw |
| Tech | Claw | Open Claw |
| Tech | Gimbal | Point at Front |
| Tech | Gimbal | Point at Ground |
| Tech | Gimbal | Point at Location |
| Tech | Gimbal | Point at Movement |
| Tech | Gimbal | Point in Direction |
| Tech | Sensor | Log Gas |
| Tech | Sensor | Log Humidity |
| Tech | Speaker | Play Audio |
| Tech | Speaker | Play Audio Loop |
| Think | Detect | Detect in Air |
| Think | Detect | Detect on Ground |
| Think | Track | Track in Air |
| Think | Track | Track on Ground |
| Trigger | Event | Wait for Button Push |
| Trigger | Event | Wait for Gas |
| Trigger | Event | Wait for Humidity |
| Trigger | Movement | Wait Until Location |
| Trigger | Time | Set a Timer |
| Trigger | Time | Wait Until Time |
| Hand | Next | Branch |
| Hand | Next | Repeat |
| Hand | End | All |
| Hand | End | Any |
| Hand | Logic | And |
| Hand | Logic | Not |
| Hand | Logic | Or |
| Deck | | Repeat |
| Deck | | Modify Condition |
| Token | Core | Movement |
| Token | Sensor | Gas |
| Token | Sensor | Humidity |
| Token | Tech | Button |
| Token | Tech | Camera |
| Token | Tech | Gimbal |
| Token | Tech | Speaker |

In some embodiments, the system allows for one or more instructional cards to be combined together to form a logical programming step, known as a "hand." Instructional cards placed in a single hand are interpreted collectively as a unit. In some embodiments, there is no specific order to the placement of instructional cards in a hand, with the exception of instructional cards that modify or input to other cards in the hand. In some embodiments, instructional cards that modify or input other cards in the same hand are linked to, placed on top of, or placed next to each other within the hand.

A hand is complete when one or more end conditions are satisfied. Instructional cards with end conditions are labeled with end flags and end descriptions on the card. By default, a hand ends when all end conditions in the hand are satisfied. For example, if the only end condition in a hand is associated with the instructional card Movement:FlyTo (description: fly to a location), the hand will complete when the device reaches the specified location. In some embodiments, specific instructional cards can alter the default setting that a given hand will end when all of the hand's end conditions are satisfied. For example, the instructional card Hand: EndCondition will allow the hand it is placed in to complete when any one of the hand's end conditions are satisfied. Thus, a hand that contained three cards with end conditions would normally complete once all three end conditions were satisfied, but if the hand also contained the Hand:EndCondition card described above, the hand would complete as soon as the first end condition was satisfied.

In some embodiments, the system allows for one or more hands to be combined together to form a logical programming group, known as a "deck." Each hand in a deck is interpreted sequentially, starting with the first hand. A deck will move on to the next hand once the hand it is currently on is complete, i.e., one or more end conditions in that hand are satisfied. In some embodiments, the deck is complete once the final hand is satisfied. In some embodiments, the final hand in a deck does not have to have an end condition. In some embodiments, the final hand in a deck will continue indefinitely until the device's battery reaches a critical threshold or other physical limitation that would require the device to return home or immediately stop operation. In some embodiments, the final hand in a deck is the only hand that does not require an end condition.

Figure 3:
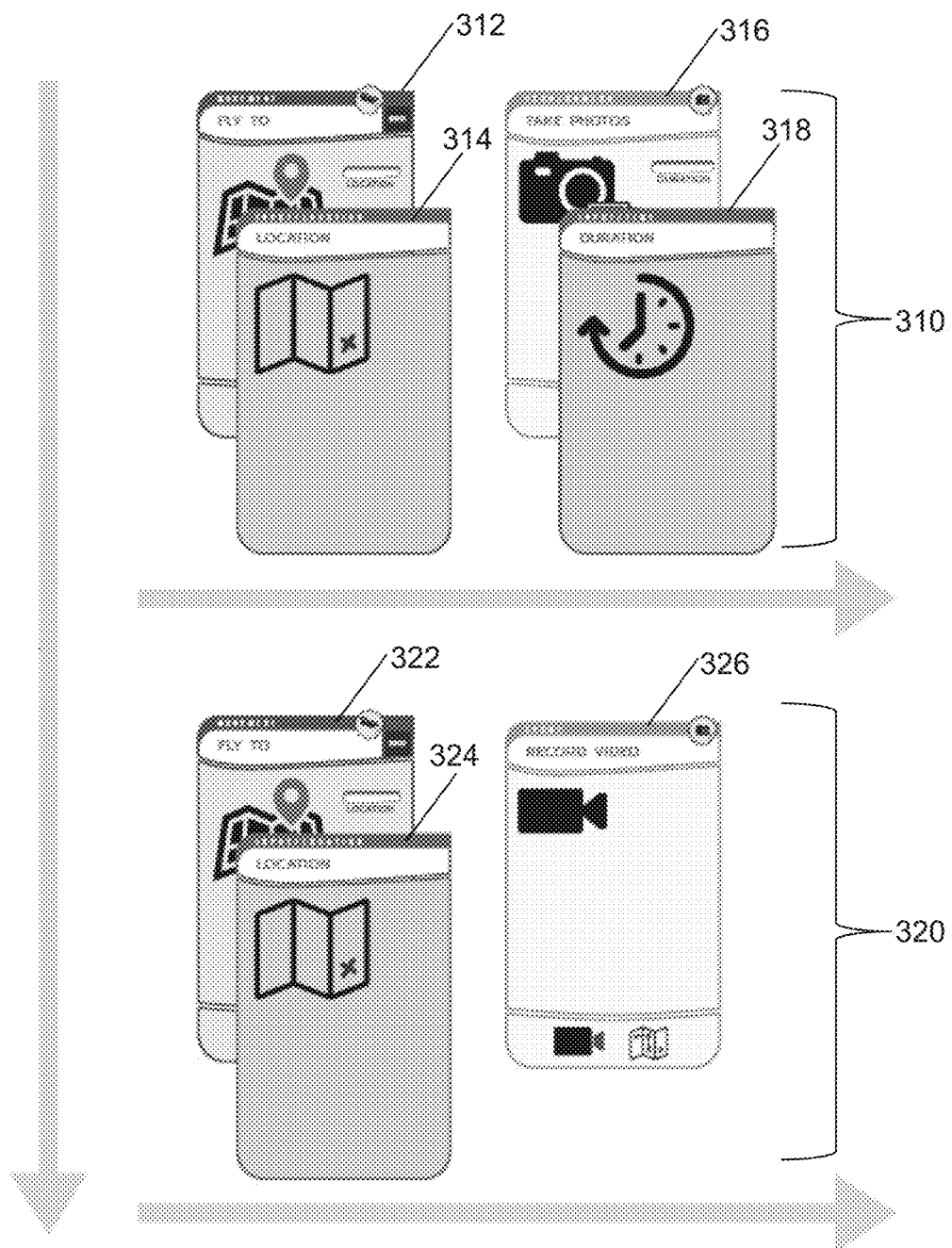
FIG. 3 depicts an overview of a programming system with multiple instructional cards, according to an embodiment.

FIG. 3 depicts an illustration of a deck with multiple hands. The first hand (310) contains four instructional cards (312, 314, 316, and 318). The second hand (320) contains three instructional cards (322, 324, and 326). The system interprets the hands in order, starting with the first hand (310). As the first hand (310) only has one end condition with the instructional card (312), the hand will complete when this end condition is satisfied and the deck will then interpret the second hand (320). In FIG. 3, the second hand (320) also has one end condition with the instructional card (322). Once the second hand (320) was complete, the deck would either complete or move on to the next available hand. (none are depicted in FIG. 3).

FIG. 3 also depicts the interaction between instructional cards. For example, instructional card (314) is providing an input, in this case a location, to instructional card (312). In this illustration, instructional cards that modify or provide input to another card are placed on top of other card.

In some embodiments, certain categories of instructional cards may modify an entire hand or an entire deck. Examples include, but are not limited to, the instructional cards detailed in Table 3:

TABLE 3 example instructional cards in the "Hand" and "Deck" categories

| Category | Title | Description |
|---|---|---|
| Hand | Any | Requires only one end condition to be satisfied before the system continues to the next hand, instead of needing every end condition in that hand to be satisfied. |
| Hand | And | Requires a hand to satisfy all end conditions on both sides of this card before the system continues to the next hand. |
| Hand | Or | Requires a hand to satisfy end conditions on only one side of this card before the system continues to the next hand. |
| Hand | Not | Requires a hand to satisfy end conditions before this card and none of the end conditions after this card before the system continues to the next hand. |
| Hand | Branch | Enables the system to proceed to more than one possible hand after the current hand is satisfied, depending on which end condition is satisfied first. This card can be applied after Hand: And, Hand: Or, and Hand: Not instructional cards. |
| Deck | Repeat | Causes the entire deck to continuously repeat, reverting to the first hand after the last hand is completed.. |
| Deck | Modify Condition | Modifies a certain condition, for example, movement speed, throughout the entire deck. |

In some embodiments, the system can compile a complete deck into an executable program. In some embodiments, the executable program comprises the logic of at least one instructional card. In some embodiments, the executable program comprises the logic of at least one hand. In some embodiments, the executable program comprises the logic of at least one deck. In some embodiments, each executable program comprises the logic of one deck. In some embodiments, the system is capable of storing, in memory, more than one deck. In some embodiments, the system can communicate, electronically or by other appropriate means, with a device. In some embodiments, the system is capable of transmitting to the device one or more executable programs.

Embodiments herein relate to methods of using the system described herein to program a device, such as a UAV or drone. In general, the method comprises a computer or other data processing system that comprises a process or memory, that runs the system and allows interactions with a user. The system receives one or more instructional cards from the user, then generates an executable program based on those cards. The executable program is then transmitted by the system to a device. In some embodiments, the device then executes the program.

In some embodiments, the user interacts with the system via a user interface. In some embodiments, the user interface is a graphical user interface. In some embodiments, the graphical user interface is displayed on a monitor. In some embodiments, the user can select from one or more instructional cards that are displayed by the user interface. In some embodiments, the system is capable of presenting a selection of instructional cards to the user via the user interface.

In some embodiments, the user can place selected instructional cards in positions on the user interface. In some embodiments, the user interface groups instructional cards into hands, and multiple hands into a deck, by the placement of instructional cards in the user interface. In some embodiments, the system defines pre-selected areas for each hand or multiple hands, wherein instructional cards placed into these areas are then associated with that respective hand. In some embodiments, the user interface displays instructional cards in an individual hand in a horizontal or approximately horizontal arrangement. In some embodiments, the user interface displays one or more hands in an individual deck in a vertical arrangement. In some embodiments, the visual arrangement of instructional cards and hands in a deck is similar to the illustration in FIG. 3. A person skilled in the art would understand that the user interface can be arranged in a multitude of ways to demonstrate to the user the relationship and structure of the instructional cards and hands in a deck, and that the examples and embodiments described herein are non-limiting. For example, the user interface could display hands vertically and decks horizontally, or other such organizational arrangements.

Figure 4:
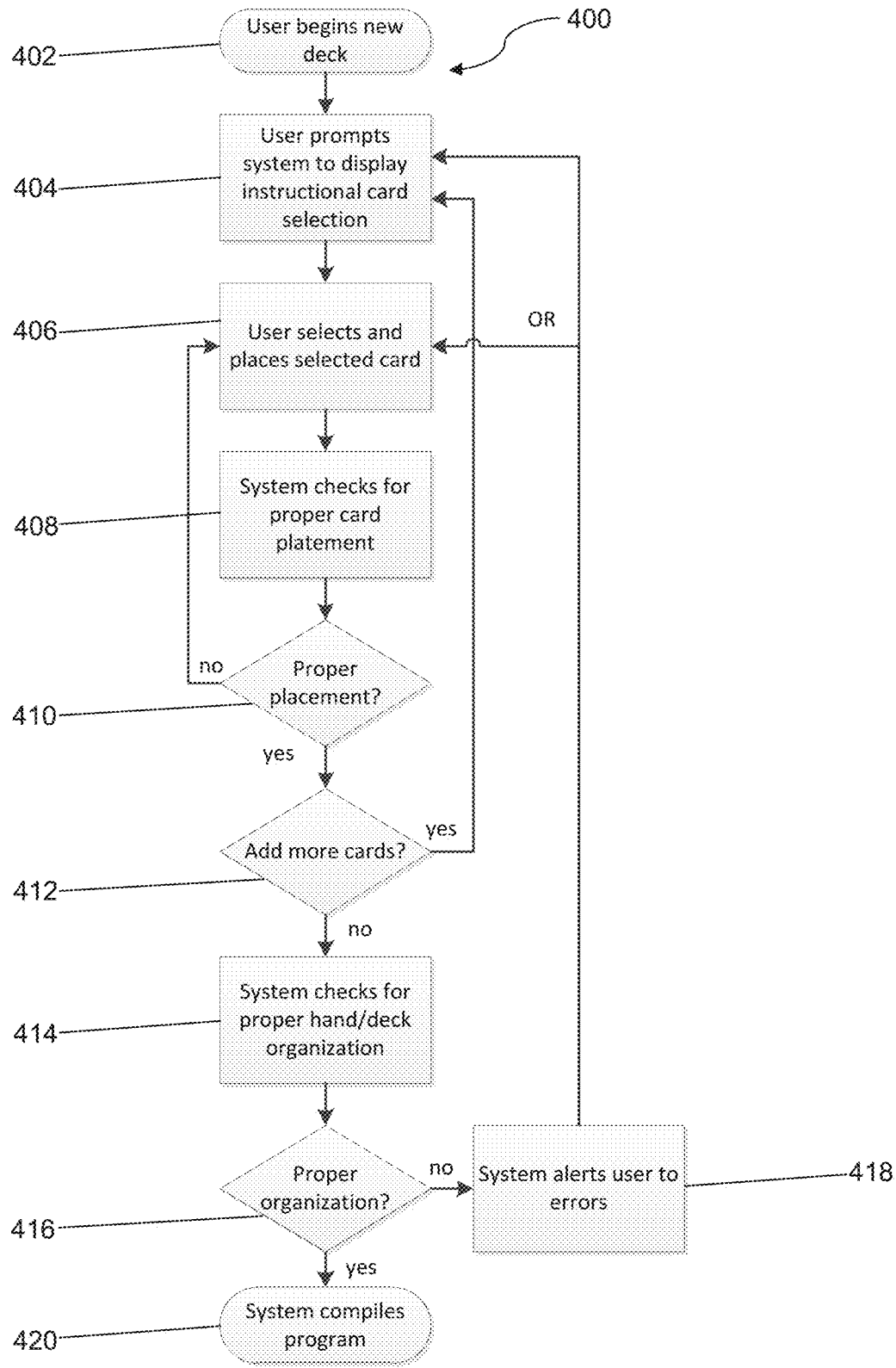
FIG. 4 depicts a flow chart of an exemplary method of using the programming system.

FIG. 4 depicts an exemplary flow chart (400) of the basic steps taken by a user to program a device with the system described herein. First, the user begins a new deck in the system (402). In some embodiments, the system will create a new, empty deck upon start-up. In some embodiments, the user can instruct the system to create a new deck. In some embodiments, the new deck is displayed as field of at least one empty hand. The user now needs to add instructional cards to the deck, and so instructs the system to display instructional cards for selection by the user (404). In some embodiments, the system displays the available instructional cards by a listing of card category/subcategory: title names. In some embodiments, the system displays the available cards by displaying the individual card faces. In some embodiments, the system displays a list of card categories, and once the user selects a category, then displays the individual card faces for selection. Once the user has selected an instructional card, the user places the card in one of the available hands in the deck (406). In some embodiments, if this instructional card is the first card in the deck, the card is automatically placed in the first hand. In some embodiments, the system highlights valid locations that the instructional card can be placed. Once placed by the user, the system checks to make sure the placement of the instructional card is proper (408), and will take different actions depending on the result (410). For example, the system checks to make sure that the instructional card does not have a token of the same type that is already present on another instructional card in the hand. If the placement is not proper, the system will direct the user back to step 406. If the placement is proper, the system will ask the user if they would like to place additional cards (412). If the user answers yes, the system will direct the user back to step 404. If the user answers no, the system will check for proper organization of the hand and the deck (414), and will take different actions depending on the result (416). For example, the system checks to make sure all requirements are present for each instructional card that has a requirement. If the organization of the deck is not proper, the system will alert the user of the one or more errors (418), and then direct the user back to either step 404 or step 406 depending on the type of correction required. For example, if the user needs to add an instructional card to fulfill a requirement, the system will direct the user back to step 404. If the user needs to move the location of an instructional card already placed, the system will direct the user back to step 406. If the organization of the deck is proper, the system will proceed to compile the deck into an executable program (420). In some embodiments, the system will save the executable program. In some embodiments, the system will transmit the executable program to a device. In some embodiments, the system will prompt the user to select an attached device to which the system will transmit the executable program.

In some embodiments, the instructional cards can be physical cards constructed from paper, plastic, or other appropriate material. When using physical instructional cards, the user would lay out the cards in an appropriate format, i.e., organized in hands, with instructional cards that modify or input to other cards placed on top of them. The user would then take a photograph of either individual hands or an entire deck. This photograph can then be inputted into the system, such that the system can recognize the categories, subcategories, titles, and placement for each individual card. In some embodiments, if the input is of an entire deck, the system can then compile deck and return to the user an executable program. In some embodiments, the system can send the executable program directly to a device. In some embodiments, the system can create a digital representation of the inputted photograph in a graphical user interface. The user could then further manipulate the instructional cards via the user interface as usual. In some embodiments, the category, subcategory, and title of any individual instructional card cannot be concealed. For example, a user with a device and physical set of instructional cards, but without direct assess the system, could arrange the instructional cards into an appropriate deck and take a picture. The user then e-mails the picture to a predetermined address, where a company representative or automated software program inputs the photograph into the system. The system attempts to compile the deck, and if successfully, the executable program can be e-mailed back to the user. If the attempt to compile the deck was not successful, an error code or error message can be sent back to the user to prompt another attempt. The user could then transmit the executable program to the device, and have the device activate the program.

In some embodiments, the system comprises a battery meter that displays to the user an estimation of available battery power for an associated device. In some embodiments, the system communicates with a device, such that the battery meter displays the actual battery level or an approximation of the battery level of the device. In some embodiments, one or more instructional cards are capable of modifying the battery meter, such that the cards alter the displayed battery level based on an estimation of energy output required for the functions or actions to be performed by the card. In some embodiments, instructional cards that modify the battery meter will not alter the battery meter until all requirements and other required inputs are present in the hand. In some embodiments, instructional cards that modify other cards will cause alterations in the battery meter. For example, in a system with a battery meter, the user places in a hand the instructional card "Movement:FlyTo." As this instructional card does not have all of the requirements met, in this case the location to which the device will fly, the card "Movement:FlyTo" does not yet alter the battery meter. The user than places the card "Input:Location" to provide a GPS coordinate to "Movement:FlyTo," completing the requirements. The system will then estimate the energy necessary for a device to complete the "Movement:FlyTo" card and modify the battery meter accordingly. In some embodiments, if the user places an instructional card that would drop the battery meter to zero percent, below zero percent, or below a predetermined level by the system, the system will provide a warning to the user. In some embodiments, the system will not allow the user to place an instructional card that drops the battery meter to or below zero percent, or below a predetermined level. In some embodiments, the predetermined level is a level of energy necessary to return the device safely to a home position.

Figure 5:
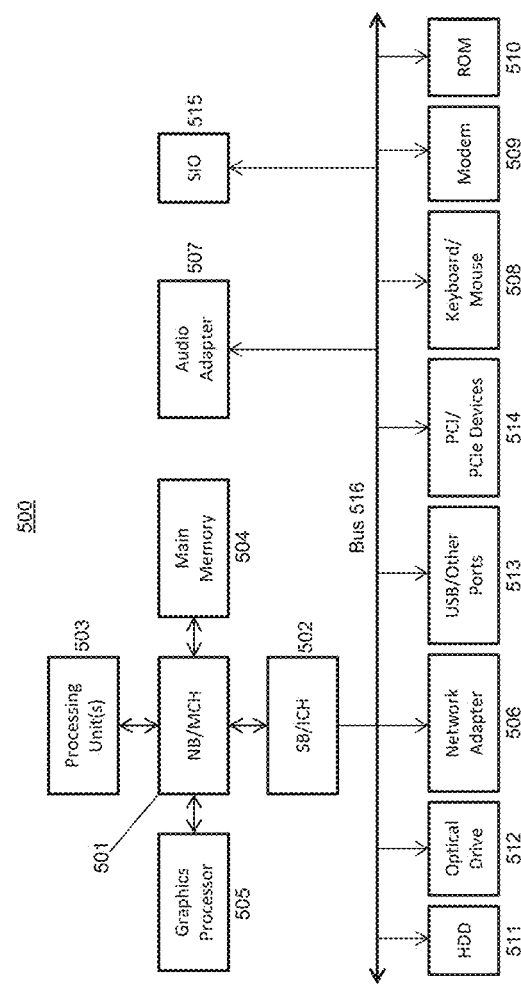
FIG. 5 depicts a block diagram of an example data processing system in which aspects of the illustrative embodiments are implemented.

FIG. 5 depicts a block diagram of an example data processing system 500 in which aspects of the illustrative embodiments are implemented. Data processing system 500 is an example of a computer, such as a sever or client, in which computer usable code or instructions implementing the process for illustrative embodiments of any of the disclosures described herein are located. In one embodiments, FIG. 5 represents a server computing device, such as a server, which implements the card-based programming system described herein.

In the depicted example, data processing system 500 can employ a hub architecture including a north bridge and memory controller hub (NB/MCH) 501 and south bridge and input/output (I/O) controller hub (SB/ICH) 502. Processing unit 503, main memory 504, and graphics processor 505 can be connected to the NB/MCH 501. Graphics processor 505 can be connected to the NB/MCH through an accelerated graphics port (AGP).

In the depicted example, the network adapter 506 connects to the SB/ICH 502. The audio adapter 507, keyboard and mouse adapter 508, modem 509, read only memory (ROM) 510, hard disk drive (HDD) 511, optical drive (CD or DVD) 512, universal serial bus (USB) ports and other communication ports 513, and the PCI/PCIe devices 514 can connect to the SB/ICH 502 through bus system 516. PCI/PCIe devices 514 may include Ethernet adapters, add-in cards, and PC cards for notebook computers. ROM 510 may be, for example, a flash basic input/output system (BIOS). The HDD 511 and optical drive 512 can use an integrated drive electronics (IDE) or serial advanced technology attachment (SATA) interface. The super I/O (SIO) device 515 can be connected to the SB/ICH.

An operating system can run on processing unit 503. The operating system can coordinate and provide control of carious components within the data processing system 500. As a client, the operating system can be a commercially available operating system. An object-oriented programming system, such as the Java™ programming system, may run in conjunction with the operating system and provide calls to the operating system from the object-oriented programs or applications executing on the data processing system 500. As a server, the data processing system 500 can be an IBM®. eServer™. System p® running the Advanced Interactive Executive operating system or the Linux operating system. The data processing system 500 can be a symmetric multiprocessor (SMP) system that can include a plurality of processors in the processing unit 503. Alternatively, a single processor system may be employed.

Instructions for the operating system, the object-oriented programming system, and applications or programs are located on storage devices, such as the HDD 511, and are loaded into the main memory 504 for execution by the processing unit 503. The processes for embodiments of the medical record error detection system can be performed by the processing unit 503 using computer usable program code, which can be located in a memory such as, for example, main memory 504, ROM 510, or in one or more peripheral devices.

A bus system 516 can be comprised of one or more busses. The bus system 516 can be implemented using any type of communication fabric or architecture that can provide for a transfer of data between different components or devices attached to the fabric or architecture. A communication unit such as the modem 509 or network adapter 506 can include one or more devices that can be used to transmit and receive data. Those of ordinary skill in the art will appreciate that the hardware required to run any of the systems and methods described herein may vary depending on the implementation. Other internal hardware or peripheral devices, such as flash memory, equivalent non-volatile memory, or optical disk drives may be used in addition to or in place of the hardware depicted. Moreover, any of the systems described herein can take the form of any of a number of different data processing systems, including but not limited to, client computing devices, server computing devices, tablet computers, laptop computers, telephone or other communication devices, personal digital assistants, and the like. Essentially, any of the systems described herein can be any known or later developed data processing system without architectural limitation.

The systems and methods of the figures are not exclusive. Other systems, and processes may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions which are executed by the processor to cause the processor to implement a card-based programming system, the method comprising:

displaying, by the programming system, a list of instructional cards available for selection by a user; wherein the list includes at least one instructional card that represents an action or behavior to be performed by a device, at least one instructional card that represents an input to at least one other instructional card, and at least one instructional card that represents a modifier to at least one other instructional card; and wherein each individual instructional card displays at least one image, and belongs to at least one category;

receiving, by the programming system, a file representing the placement of one or more instructional cards;

interpreting, by the programming system, the card type of one or more instructional cards from the file;

organizing, by the programming system, the instructional cards into at least one hand, wherein an individual hand comprises one or more instructional cards that are interpreted as a logical program step, and wherein the instructional cards in the at least one hand are restricted by the physical limitations of the device; and generating, by the programming system, an executable program based on the instructional cards received by the programming system.

2. The method of claim 1, wherein the method further comprises:

receiving, by the programming system, one or more additional instructional cards selected by the user.

3. The method of claim 1, wherein the method further comprises:

transmitting, by the programming system, the executable program to the device.

4. The method of claim 1, wherein the method further comprises:

transmitting, by the programming system, the executable program to the user.

5. The method of claim 1, where in the file presenting the placement of one or more instructional cards is a digitized representation of a photograph of a card layout.

6. The method of claim 1, wherein the programming system interprets the one or more instructional cards in a hand simultaneously with each other.

7. The method of claim 1, wherein the programming system further comprises one or more decks, and wherein an individual deck comprises one or more hands that are interpreted as a logical program group.

8. The method of claim 7, wherein the programming system interprets the one or more hands in a deck sequentially.

9. The method of claim 7, wherein the programming system generates the executable program from an individual deck.

10. The method of claim 7, wherein the file representing the placement of one or more instructional cards is a digitized representation of one or more hands or one or more decks.

11. The method of claim 1, wherein the programming system comprises a graphical user interface.

12. The method of claim 11, wherein the programming system is capable of displaying instructional cards to the user via the graphical user interface.

13. The method of claim 11, wherein the programming system receives one or more instructional cards via the graphical user interface.

14. The method of claim 1, wherein each instructional card comprises a category, a subcategory, an image, a description, and a title.

15. The method of claim 14, wherein the category comprises one or more of: movement, input, modifier, tech, think, trigger, hand, deck, and token.

16. The method of claim 14, wherein each instructional card further comprises one or more of an end flag, an end description, a yield, a yield description, one or more yield icons, one or more requirements, and one or more tokens.

17. The method of claim 1, wherein the device executes the executable program, and wherein the device is a unmanned autonomous vehicle.

18. A system for programming a device via a card-based programming system, comprising:

a programming system processor configured to:

display a list of instructional cards available for selection by a user; wherein the list includes at least one instructional card that represents an action or behavior to be performed by a device, at least one instructional card that represents an input to at least one other instructional card, and at least one instructional card that represents a modifier to at least one other instructional card; and wherein each individual instructional card displays at least one image, and belongs to at least one category;

receive a file representing the placement of one or more instructional cards selected by the user;

interpret the card type of the one or more instructional cards from the file;

organize the instructional cards into at least one hand, wherein an individual hand comprises one or more instructional cards that are interpreted as a logical program step, and wherein the instructional cards in the at least one hand are restricted by the physical limitations of the device; and generate an executable program based on the instructional cards received by the programming system.

19. The system of claim 18, wherein the programming system is further configured to receive one or more additional instructions cards selected by the user, and transmit the executable program to the device, the user, or both.

20. The system of claim 18, wherein the programming system further comprises one or more decks, wherein an individual deck comprises one or more hands that are interpreted as a logical program group, wherein the programming system interprets the one or more hands in a deck sequentially, wherein the file representing the placement of one or more instructional cards is a digitized representation of one or more hand or one or more decks, and wherein the programming system generates the executable program from an individual deck.

* * * * *